US012776451B2

(12) United States Patent
Matsuoka

(10) Patent No.: US 12,776,451 B2
(45) Date of Patent: Oct. 27, 2026

(54) CERAMIC ELECTRONIC DEVICE HAVING INTERNAL ELECTRODES INCLUDING DIFFERENT TYPES OF METAL, AND MANUFACTURING METHOD OF THE SAME

(71) Applicant: TAIYO YUDEN CO., LTD., Tokyo (JP)

(72) Inventor: Ayumi Matsuoka, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 111 days.

(21) Appl. No.: 18/479,345

(22) Filed: Oct. 2, 2023

(65) Prior Publication Data

US 2024/0120153 A1 Apr. 11, 2024

(30) Foreign Application Priority Data

Oct. 6, 2022 (JP) ................................ 2022-161773

(51) Int. Cl.
*H01G 4/30* (2006.01)
*H01G 4/008* (2006.01)
(Continued)

(52) U.S. Cl.
CPC ............... *H01G 4/30* (2013.01); *H01G 4/008* (2013.01); *H01G 4/012* (2013.01); *H01G 4/1209* (2013.01); *H01G 4/224* (2013.01)

(58) Field of Classification Search
CPC .......... H01G 4/30; H01G 4/008; H01G 4/012; H01G 4/1209; H01G 4/224; H01G 4/0085; H01G 4/1227; H01G 4/2325
See application file for complete search history.

(56) References Cited

U.S. PATENT DOCUMENTS

2003/0062112 A1 4/2003 Matsumoto ................ 156/89.16
2006/0023398 A1* 2/2006 Iwanaga ............. H01G 4/0085
361/321.2
(Continued)

FOREIGN PATENT DOCUMENTS

JP 2003-7562 A 1/2003
JP 2003-007562 A 1/2003
(Continued)

OTHER PUBLICATIONS

Notice of Reasons for Refusal issued on May 12, 2026 in a counterpart Japanese Patent Application No. 2022-161773.

*Primary Examiner* — Timothy J. Dole
(74) *Attorney, Agent, or Firm* — Stein IP, LLC

(57) ABSTRACT

A ceramic electronic device includes a multilayer chip in which dielectric layers including ceramic as a main component and internal electrode layers including a first metal as a main component are alternately stacked, and the internal electrode layers is exposed alternately to portions of the multilayer chip, and external electrodes, each of which is provided on each of the portions of the multilayer chip. A dielectric pattern is provided in end margins where internal electrode layers connected to one of the external electrodes face each other with no internal electrode layer connected to the other of the external electrodes interposed therebetween. The internal electrode layers include one or more type of a second metal which is different from the first metal. A concentration of the second metal in the plurality of dielectric layers is higher than a concentration of the second metal of the dielectric pattern.

13 Claims, 10 Drawing Sheets

(51) Int. Cl.

| | |
|---|---|
| ***H01G 4/012*** | (2006.01) |
| ***H01G 4/12*** | (2006.01) |
| ***H01G 4/224*** | (2006.01) |

(56) References Cited

U.S. PATENT DOCUMENTS

| | | | | |
|---|---|---|---|---|
| 2013/0049532 | A1* | 2/2013 | Kim | H01C 7/18 361/321.1 |
| 2013/0094121 | A1* | 4/2013 | Endo | H01G 4/1209 361/305 |
| 2013/0321980 | A1* | 12/2013 | Suzuki | H01G 4/1227 29/25.42 |
| 2016/0126014 | A1* | 5/2016 | Lee | H01G 4/224 29/25.42 |
| 2019/0006107 | A1* | 1/2019 | Kim | H01G 4/012 |
| 2019/0027311 | A1* | 1/2019 | Chigira | H01G 4/30 |
| 2020/0075256 | A1* | 3/2020 | Park | H01G 4/232 |
| 2020/0189979 | A1 | 6/2020 | Taniguchi et al. | C04B 35/4682 |
| 2020/0411246 | A1* | 12/2020 | Yao | H01G 4/224 |
| 2021/0151252 | A1* | 5/2021 | Nakamura | H10D 1/692 |
| 2021/0202177 | A1* | 7/2021 | Kurosu | H01G 4/008 |
| 2022/0102078 | A1* | 3/2022 | Kitahara | H01G 4/224 |
| 2022/0157525 | A1* | 5/2022 | Cho | H01G 4/232 |
| 2024/0304388 | A1* | 9/2024 | Yamaguchi | H01G 4/30 |

FOREIGN PATENT DOCUMENTS

| | | | |
|---|---|---|---|
| JP | 2003-173925 | A | 6/2003 |
| JP | 2005-277176 | A | 10/2005 |
| JP | 2019-021816 | A | 2/2019 |
| JP | 2020-093952 | A | 6/2020 |

* cited by examiner

CERAMIC ELECTRONIC DEVICE HAVING INTERNAL ELECTRODES INCLUDING DIFFERENT TYPES OF METAL, AND MANUFACTURING METHOD OF THE SAME

CROSS-REFERENCE TO RELATED APPLICATION

This application is based upon and claims the benefit of priority of the prior Japanese Patent Application No. 2022-161773, filed on Oct. 6, 2022, the entire contents of which are incorporated herein by reference.

FIELD

A certain aspect of the present disclosure relates to a ceramic electronic device and a manufacturing method of the ceramic electronic device.

BACKGROUND

In high-frequency communication systems typified by mobile phones, there is a demand for small-sized, large-capacity multilayer ceramic capacitors to add further functionality. To reduce the size and increase the capacity, it is effective to reduce the thickness of the dielectric layers and internal electrode layers and increase the number of layers. However, when the dielectric layer is made thinner, the electric field intensity is lowered when the capacitor is used, which is disadvantageous in terms of insulation reliability. Therefore, as a measure to ensure insulation reliability in thin dielectric layers, there is disclosed a method of adding an additive metal element to the dielectric layer and the internal electrode layer, and forming a thin layer of the additive metal element between the internal electrode layer and the dielectric layer (see, for example, Japanese Patent Application Publication No. 2003-7562).

SUMMARY OF THE INVENTION

According to an aspect of the embodiments, there is provided a ceramic electronic device including: a multilayer chip in which each of a plurality of dielectric layers including ceramic as a main component and each of a plurality of internal electrode layers including a first metal as a main component are alternately stacked, and each of the plurality of internal electrode layers is exposed alternately to a plurality of portions of the multilayer chip; and external electrodes, each of which is provided on each of the plurality of portions of the multilayer chip, wherein a dielectric pattern is provided in end margins where internal electrode layers connected to one of the external electrodes face each other with no internal electrode layer connected to the other of the external electrodes interposed therebetween, wherein the plurality of internal electrode layers include one or more type of a second metal which is different from the first metal, and wherein a concentration of the second metal in the plurality of dielectric layers is higher than a concentration of the second metal of the dielectric pattern.

According to another aspect of the embodiments, there is provided a ceramic electronic device including: a multilayer chip in which each of a plurality of dielectric layers including ceramic as a main component and each of a plurality of internal electrode layers including a first metal as a main component are alternately stacked, and each of the plurality of internal electrode layers is exposed alternately to a plurality of portions of the multilayer chip; and external electrodes, each of which is provided on each of the plurality of portions of the multilayer chip, wherein the plurality of internal electrode layers include one or more type of a second metal which is different from the first metal, wherein a concentration of the second metal in the plurality of internal electrode layers is higher in a capacity section where two adjacent internal electrode layers connected to different external electrodes face each other than in end margins where internal electrode layers connected to one of the external electrodes face each other with no internal electrode layer connected to the other of the external electrodes interposed therebetween.

According to another aspect of the embodiments, there is provided a ceramic electronic device including: a multilayer chip in which each of a plurality of dielectric layers including ceramic as a main component and each of a plurality of internal electrode layers including a first metal as a main component are alternately stacked, and each of the plurality of internal electrode layers is exposed alternately to a plurality of portions of the multilayer chip; and external electrodes, each of which is provided on each of the plurality of portions of the multilayer chip, wherein a dielectric pattern is provided in end margins where internal electrode layers connected to one of the external electrodes face each other with no internal electrode layer connected to the other of the external electrodes interposed therebetween, wherein the plurality of internal electrode layers include one or more type of a second metal which is different from the first metal, and wherein a difference between electronegativity of the second metal of the plurality of dielectric layers and electronegativity of the second metal of the dielectric pattern is within ±0.4.

According to another aspect of the embodiments, there is provided a manufacturing method of a ceramic electronic device including: preparing a multilayer structure in which a plurality of stack units are stacked, each of the stack units having a structure in which an internal electrode pattern including powder of a first metal as a main component and powder of a second metal and a dielectric pattern including ceramic powder arranged around the internal electrode pattern are formed on a dielectric green sheet including ceramic powder; and firing the multilayer structure, wherein a concentration of the second metal in the dielectric green sheet is higher than a concentration of the second metal in the dielectric pattern, in the multilayer structure before the firing.

DETAILED DESCRIPTION

By adding an additive metal element to the internal electrode layer, an electrical barrier is formed between the internal electrode layer and the dielectric layer, ensuring insulation reliability. However, if the additive metal element is present in the extraction portions of the internal electrode layers, the bondability between the internal electrode layers and the external electrodes may deteriorate, and sufficient electrical characteristics may not be obtained.

Hereinafter, an exemplary embodiment will be described with reference to the accompanying drawings.

Figure 1:
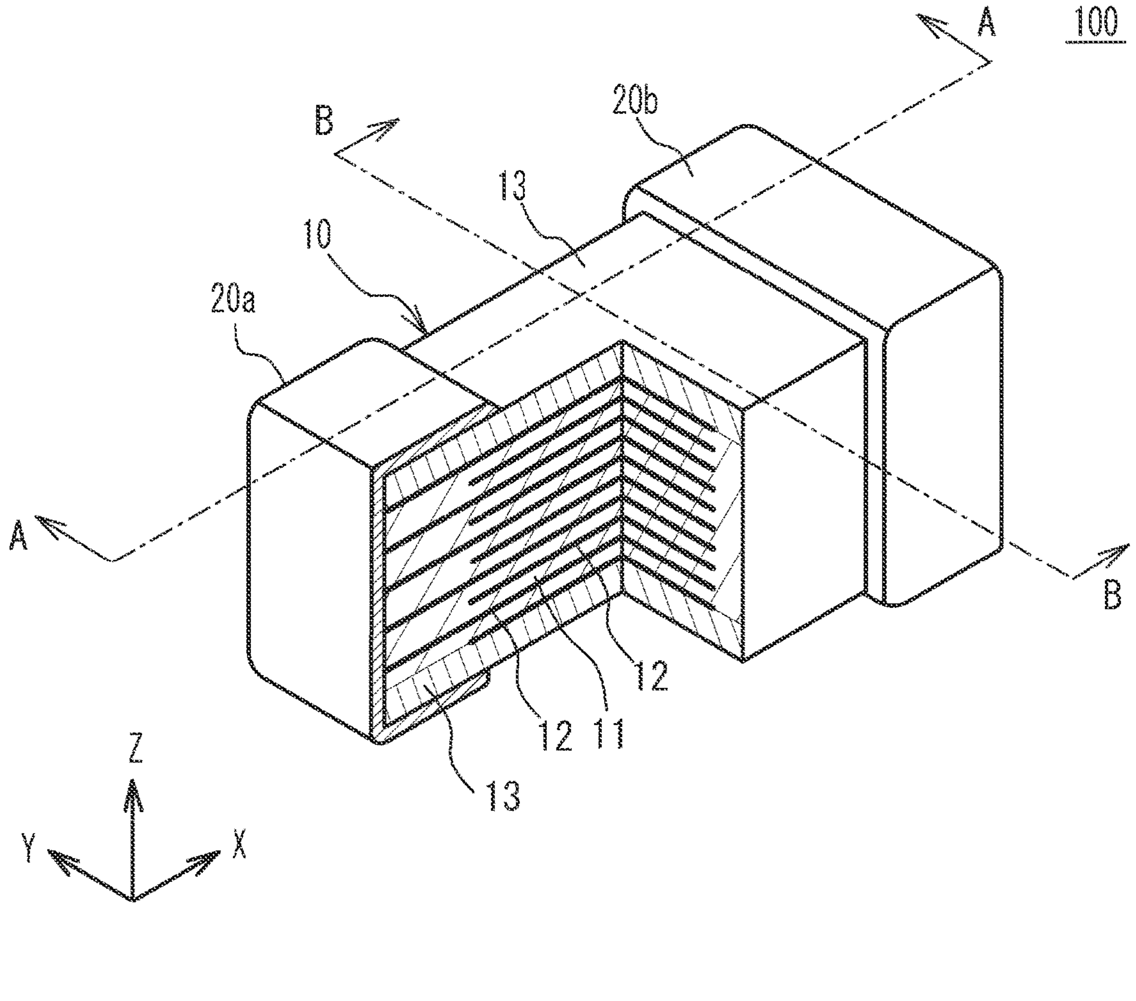
FIG. 1 is a partial cross-sectional perspective view of a multilayer ceramic capacitor.
Figure 2:
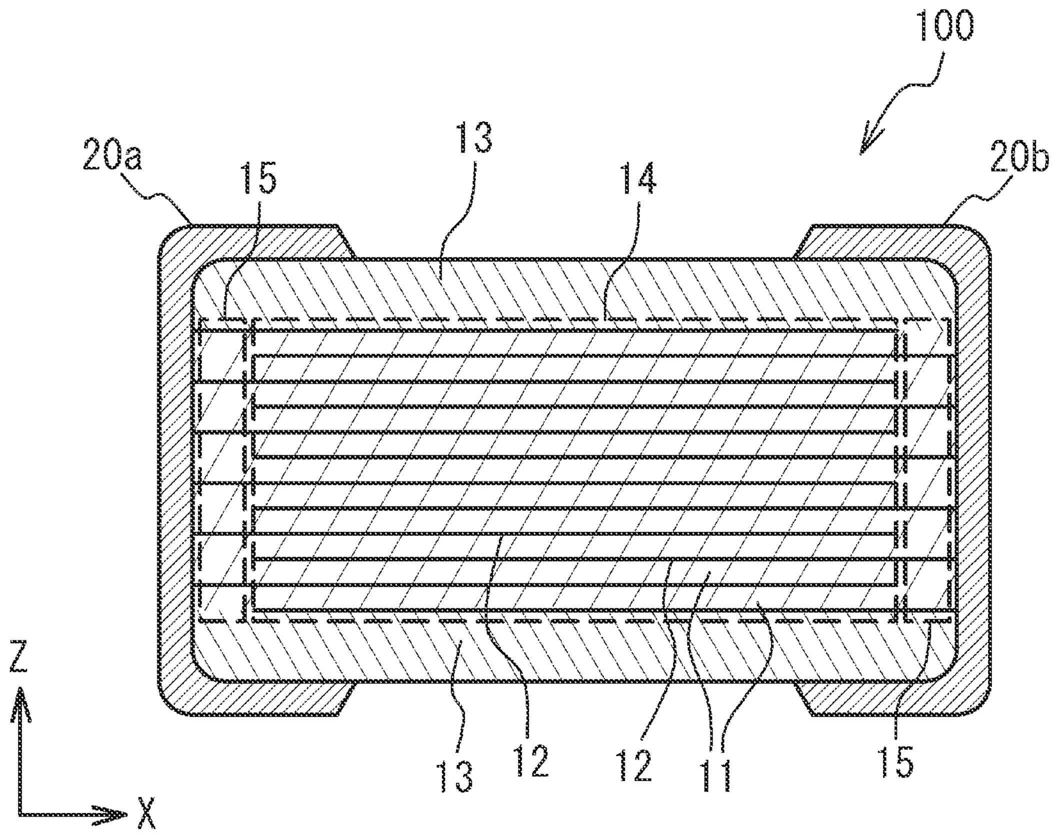
FIG. 2 is a cross-sectional view taken along line A-A in FIG. 1.
Figure 3:
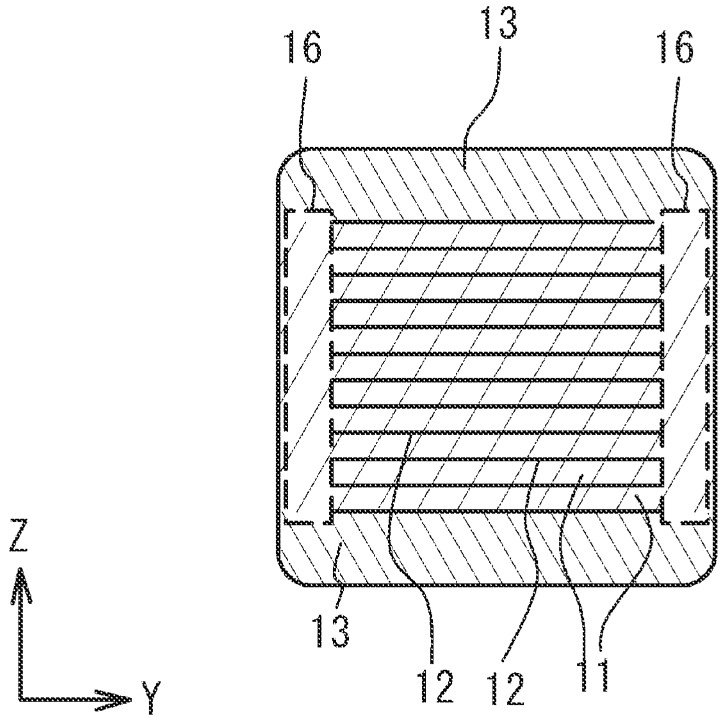
FIG. 3 is a cross-sectional view taken along line B-B in FIG. 1.

(Embodiment) FIG. 1 illustrates a perspective view of a multilayer ceramic capacitor 100 in accordance with an embodiment, in which a cross section of a part of the multilayer ceramic capacitor 100 is illustrated. FIG. 2 is a cross-sectional view taken along line A-A in FIG. 1. FIG. 3 is a cross-sectional view taken along line B-B in FIG. 1. As illustrated in FIG. 1 to FIG. 3, the multilayer ceramic capacitor 100 includes a multilayer chip 10 having a rectangular parallelepiped shape, and external electrodes 20*a* and 20*b* that are respectively provided on two edge faces of the multilayer chip 10 facing each other. Among four faces other than the two edge faces of the multilayer chip 10, two faces other than the top face and the bottom face in the stack direction are referred to as side faces. Each of the external electrodes 20*a* and 20*b* extends to the top face and the bottom face in the stack direction and the two side faces of the multilayer chip 10. However, the external electrodes 20*a* and 20*b* are spaced from each other.

In FIG. 1 to FIG. 3, an X-axis direction is a longitudinal direction of the multilayer chip 10. The X-axis direction is a direction in which the two end faces of the multilayer chip 10 are opposite to each other and in which the external electrode 20*a* is opposite to the external electrode 20*b*. AY-axis direction is a width direction of the internal electrode layers. The Y-axis direction is a direction in which the two side faces of the multilayer chip 10 are opposite to each other. A Z-axis direction is a stacking direction. The Z-axis direction is a direction in which the upper face of the multilayer chip 10 is opposite to the lower face of the multilayer chip 10. The X-axis direction, the Y-axis direction and the Z-axis direction are vertical to each other.

The multilayer chip 10 has a structure designed to have dielectric layers 11 and internal electrode layers 12 alternately stacked. The dielectric layer 11 contains a ceramic material acting as a dielectric material. The internal electrode layer 12 contains a base metal. End edges of the internal electrode layers 12 are alternately exposed to a first end face of the multilayer chip 10 and a second end face of the multilayer chip 10 that is different from the first end face. The external electrode 20*a* is provided on the first end face. The external electrode 20*b* is provided on the second end face. Thus, the internal electrode layers 12 are alternately electrically connected to the external electrode 20*a* and the external electrode 20*b*. Accordingly, the multilayer ceramic capacitor 100 has a structure in which a plurality of the dielectric layers 11 are stacked with the internal electrode layers 12 interposed therebetween. In the multilayer structure of the dielectric layers 11 and the internal electrode layers 12, the outermost layers in the stack direction are the internal electrode layers 12, and cover layers 13 cover the top face and the bottom face of the multilayer structure. The cover layer 13 is mainly composed of a ceramic material. For example, the main component of the cover layer 13 is the same as the main component of the dielectric layer 11.

For example, the multilayer ceramic capacitor 100 may have a length of 0.25 mm, a width of 0.125 mm, and a height of 0.125 mm. The multilayer ceramic capacitor 100 may have a length of 0.4 mm, a width of 0.2 mm, and a height of 0.2 mm. The multilayer ceramic capacitor 100 may have a length of 0.6 mm, a width of 0.3 mm, and a height of 0.3 mm. The multilayer ceramic capacitor 100 may have a length of 0.6 mm, a width of 0.3 mm, and a height of 0.110 mm. The multilayer ceramic capacitor 100 may have a length of 1.0 mm, a width of 0.5 mm, and a height of 0.5 mm. The multilayer ceramic capacitor 100 may have a length of 1.0 mm, a width of 0.5 mm, and a height of 0.1 mm. The multilayer ceramic capacitor 100 may have a length of 3.2 mm, a width of 1.6 mm, and a height of 1.6 mm. The multilayer ceramic capacitor 100 may have a length of 4.5 mm, a width of 3.2 mm, and a height of 2.5 mm. However, the size of the multilayer ceramic capacitor 100 is not limited to the above sizes.

A main component of the dielectric layer 11 is a ceramic material having a perovskite structure expressed by a general formula $ABO_3$. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $MgTiO_3$ (magnesium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure. $Ba_{1-x-y}Ca_xSr_yTi_{1-z}Zr_zO_3$ may be barium strontium titanate, barium calcium titanate, barium zirconate, barium titanate zirconate, calcium titanate zirconate, barium calcium titanate zirconate or the like.

Additives may be added to the dielectric layer 11. As additives to the dielectric layer 11, molybdenum (Mo), niobium (Nb), tantalum (Ta), tungsten (W), magnesium (Mg), manganese (Mn), vanadium (V), chromium (Cr), rare earth elements (yttrium (Y), samarium (Sm), europium (Eu), gadolinium (Gd), terbium (Tb), dysprosium (Dy), holmium (Ho), erbium (Er), thulium (Tm) and ytterbium (Yb)) or an oxide of cobalt (Co), nickel (Ni), lithium (Li), boron (B), sodium (Na), potassium (K) or silicon (Si), or a glass including cobalt, nickel, lithium, boron, sodium, potassium or silicon.

The main component (first metal) of the internal electrode layer 12 is not particularly limited, but is a base metal such as Ni, Cu (copper), Sn (tin). As a main component of the internal electrode layers 12, noble metals such as Pt (platinum), Pd (palladium), Ag (silver), Au (gold), and alloys containing these may be used.

The internal electrode layer 12 contains an additive metal element (second metal) in addition to the main component metal. Although the additive metal element is not particularly limited, it is preferably a metal that is nobler than the main component metal of the internal electrode layers 12. The additive metal element is, for example, one or more selected from Au, Sn, Cr, Fe (iron), Y, In (indium), As (arsenic), Co, Cu, Ir (iridium), Mg, Os (osmium), Pd, Pt, Re (rhenium), Rh (rhodium), Ru (ruthenium), Se (selenium), Te (tellurium), W, and Zn (zinc).

As illustrated in FIG. 2, the section where the internal electrode layer 12 connected to the external electrode 20*a* faces the internal electrode layer 12 connected to the external electrode 20*b* is a section where capacity is generated in the multilayer ceramic capacitor 100. Thus, this section is referred to as a capacity section 14. That is, the capacity section 14 is a section where two adjacent internal electrode layers 12 connected to different external electrodes face each other.

The section where the internal electrode layers 12 connected to the external electrode 20*a* face each other with no internal electrode layer 12 connected to the external electrode 20*b* interposed therebetween is referred to as an end margin 15. The section where the internal electrode layers 12 connected to the external electrode 20*b* face each other with no internal electrode layer 12 connected to the external electrode 20*a* interposed therebetween is also the end margin 15. That is, the end margin 15 is a section where the internal electrode layers 12 connected to one of the external electrodes face each other with no internal electrode layer 12 connected to the other of the external electrodes interposed therebetween.

As illustrated in FIG. 3, in the multilayer chip 10, the section from each of the two side faces of the multilayer chip 10 to the internal electrode layers 12 is referred to as a side margin 16. That is, the side margin 16 is a section that covers each of the edges, extending toward the respective side faces of the multilayer structure, of the stacked internal electrode layers 12. The side margin 16 is a section where no capacity is generated.

Figure 4A:
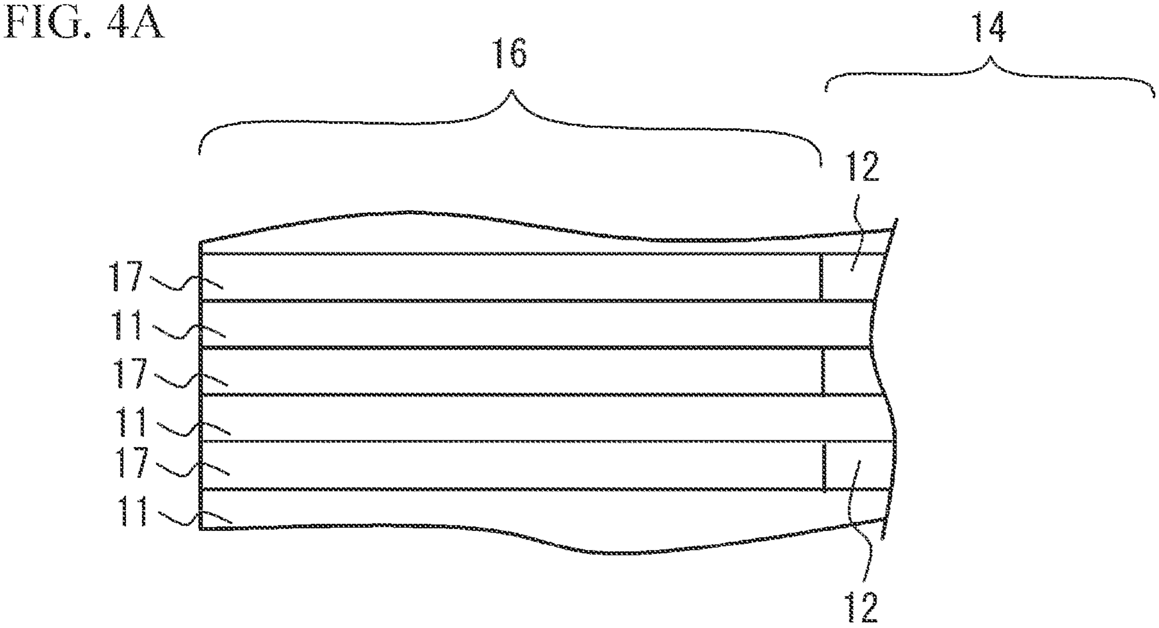
FIG. 4A is an enlarged cross-sectional view of a side margin.

FIG. 4A is an enlarged cross-sectional view of the side margin 16. Hatches are omitted in FIG. 4A. The side margin 16 has a structure in which the dielectric layers 11 and dielectric pattern layers 17 are alternately stacked in the stacking direction of the dielectric layers 11 and the internal electrode layers 12 in the capacity section 14. Each of the dielectric layers 11 of the capacity section 14 and each of the dielectric layer 11 of the side margin 16 are layers that are continuous with each other. According to this configuration, the step between the capacity section 14 and the side margin 16 is suppressed.

Figure 4B:
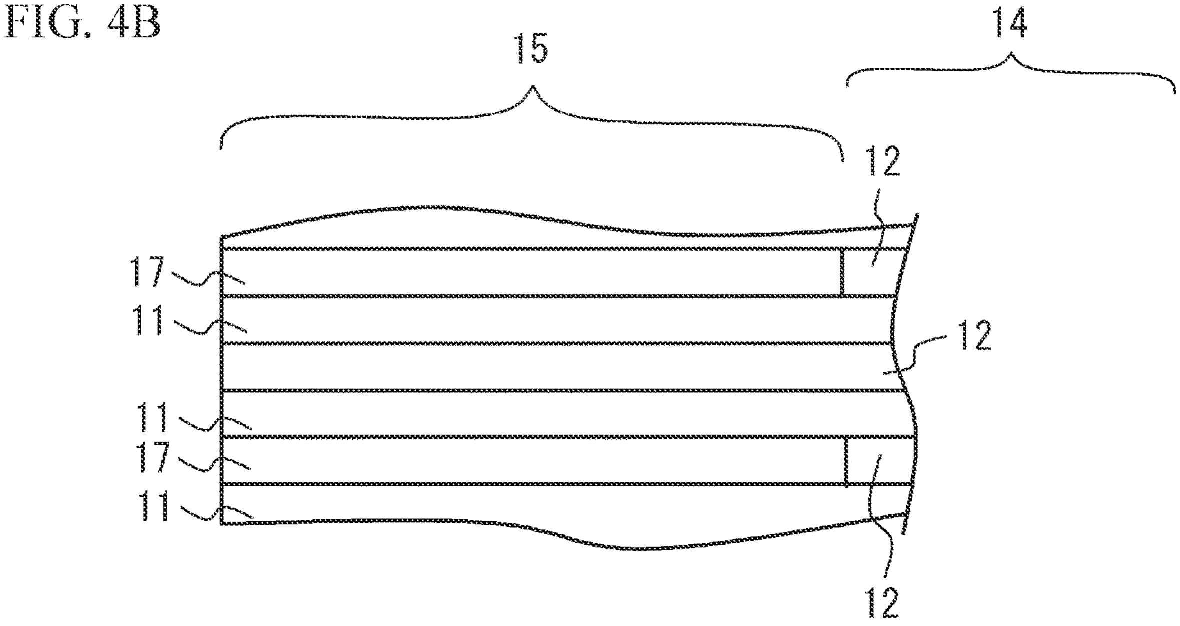
FIG. 4B is an enlarged cross-sectional view of an end margin.

FIG. 4B is an enlarged cross-sectional view of the end margin 15. Hatches are omitted in FIG. 4B. In comparison with the side margins 16, in the end margins 15, the internal electrode layers 12 of the stacked internal electrode layers 12 extend to the end faces of the end margins 15 every other one. Moreover, the dielectric pattern layer 17 is not stacked in the layer where the internal electrode layer 12 extends to the end face of the end margin 15. Each of the dielectric layers 11 of the capacity section 14 and each of the dielectric layers 11 of the end margin 15 are layers that are continuous with each other. According to this configuration, the step between the capacity section 14 and the end margin 15 is suppressed.

In order to increase the size and capacity of such multilayer ceramic capacitors, there is a demand for thinner dielectric layers, thinner internal electrode layers, and higher stacking. However, thinning the dielectric layer is accompanied by an increase in electric field strength, making it more difficult to ensure long lifetime. In addition to the study of dielectric material design, such as solid-solving small amount of additives such as rare earth oxides in dielectric materials such as barium titanate, in recent years, dissimilar metal elements have been added to internal electrode layers as additive metal elements. And, a study by designing the interface between the dielectric layer and the internal electrode layer has been reported. It is thought that by forming a segregation layer containing an additive metal element at the interface between the dielectric layer and the internal electrode layer, the electrical barrier is strengthened and the lifetime is improved.

Figure 5:
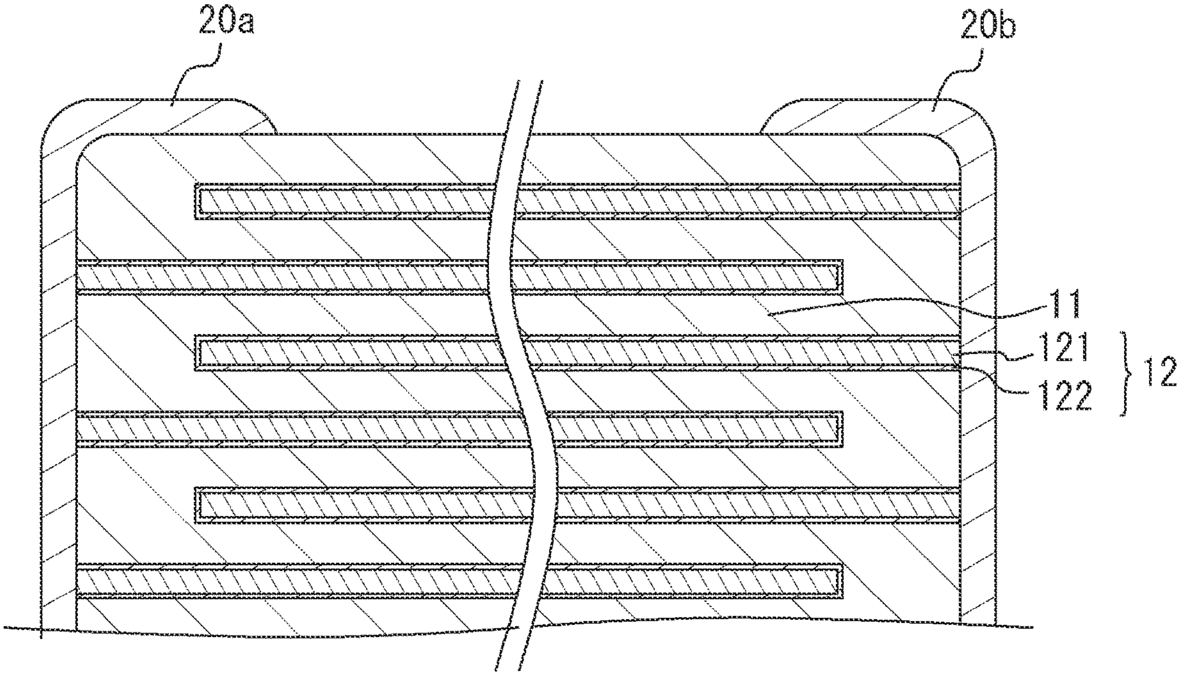
FIG. 5 is a diagram for explaining details of vicinity of an interface between an internal electrode layer and a dielectric layer.

In the internal electrode layers 12, it is preferable that a large amount of the additive metal element exists near the interface between the dielectric layers 11 and the internal electrode layers 12. FIG. 5 is a diagram for explaining the details of the vicinity of the interface between the internal electrode layer 12 and the dielectric layer 11 in this case. For example, as illustrated in FIG. 5, the internal electrode layer 12 has a structure in which a main component metal layer 121 is covered with a segregation layer 122. For example, the segregation layer 122 is formed on a first main face which is one main face (upper main face in FIG. 5) of the main component metal layer 121. Another segregation layer 122 is also formed under a second main face, which is the other main face (the lower main face in FIG. 5) of the main component metal layer 121. Note that the segregation layer 122 does not necessarily cover the entire first and second main faces of the main component metal layer 121, and may partially cover the first and second main faces of the main component metal layer 121.

The segregation layer 122 is a layer in which the additive metal element segregates. In addition, in each of the main component metal layer 121 and the segregation layer 122, not only a single metal exists, but each metal partially diffuses into each layer. The main component metal layer 121 contains, for example, 98 at % or more of the main component metal. The main component metal layer 121 may contain the additional metal element contained in the segregation layer 122. The segregation layer 122 may contain the main component metal of the main component metal layer 121.

For example, by performing line analysis in the stacking direction, it is possible to confirm that the segregation layer 122 is formed in the internal electrode layer 12. For example, in a TEM (transmission electron microscope) analysis of a cross section along the stacking direction, line analysis of each component element concentration for each sample point along the stacking direction of the dielectric layer 11 and the internal electrode layer 12 is performed. If it can be confirmed that a peak appears in the concentration of the additive metal element between the interface of the main component metal layer 121 and the interface of the dielectric layer 11, it can be confirmed that the segregation layer 122 is formed. In order to reduce noise, measurement results may be smoothed by averaging at about nine points during line analysis.

For example, the thickness of the segregation layer 122 is 0.5 nm or more and 2.8 nm or less, 0.5 nm or more and 2.0 nm or less, or 0.5 nm or more and 1.3 nm or less. The thickness of the segregation layer 122 is defined by the half width of the concentration peak of the additive metal element obtained by the line analysis.

Since the internal electrode layer 12 has the segregation layer 122 at the interface with the dielectric layer 11 in this manner, the electrical barrier between the internal electrode layer 12 and the dielectric layer 11 is strengthened, and the lifetime of the multilayer ceramic capacitor 100 is extended.

However, the presence of the additive metal element in the internal electrode layer at the end margin causes a difference in thermal conductivity, and the temperature at which the internal electrode layer and the external electrode undergo sintering shrinkage differs. There is a possibility that the bondability between the internal electrode layer and the external electrode deteriorates due to the formation of a gap between the internal electrode layer and the external electrode, and sufficient electrical characteristics cannot be obtained.

Therefore, the multilayer ceramic capacitor 100 according to the present embodiment has a configuration capable of improving the bondability between the internal electrode layers 12 and the external electrodes 20*a* and 20*b*.

Figure 6:
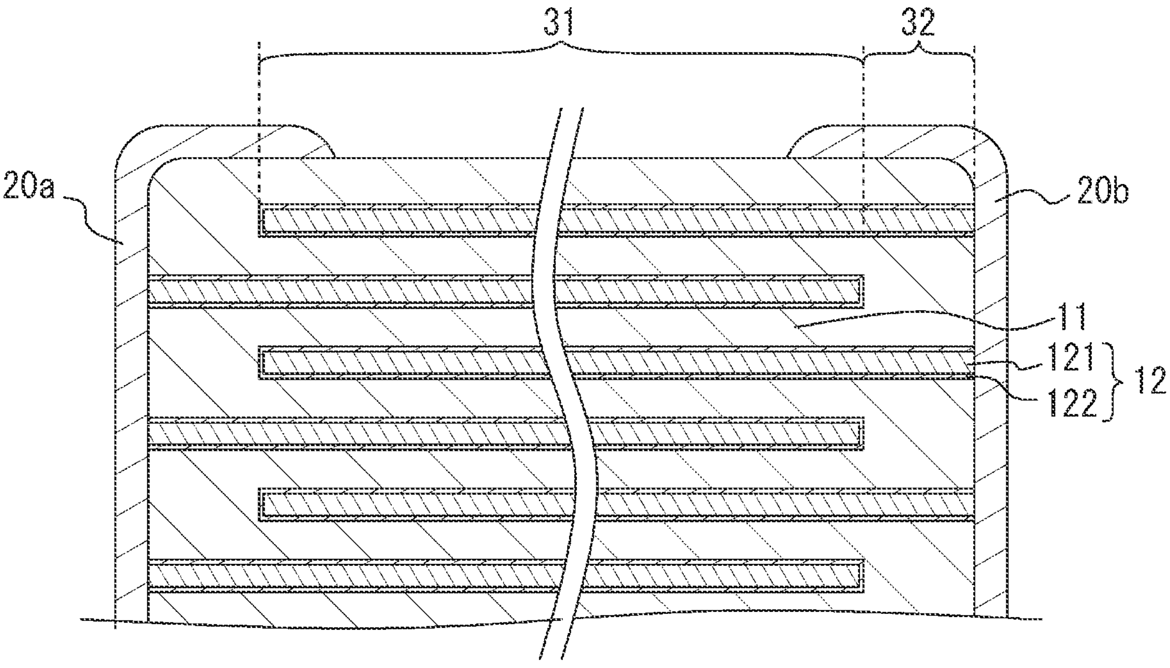
FIG. 6 illustrates a first section and a second section of an internal electrode layer.

First, in the internal electrode layer 12, as illustrated in FIG. 6, the section within the capacity section 14 in FIG. 2 is called a first section 31, and the section within the end margin 15 in FIG. 2 is called a second section 32. The concentration of the additive metal element is lower in the second section 32 than in the first section 31. With this configuration, since the amount of the additive metal element is small in the end margins 15, the bondability between the internal electrode layers 12 and the external electrodes 20*a* and 20*b* is improved. On the other hand, in the capacity section 14, the segregation layer 122 containing the additive metal element is sufficiently formed, and the electrical barrier between the internal electrode layer 12 and the dielectric layer 11 is sufficiently formed. The concentration of the additive metal element is at % of the additive metal element when the main component metal of the internal electrode layer 12 is 100 at %.

The method of measuring the concentration of the additive metal element is not particularly limited, but the following methods can be mentioned, for example. Specifically, the multilayer ceramic capacitor 100 is polished from the side margin 16 side to expose the XZ cross section at the center in the Y-axis direction. In the internal electrode layer 12 in this XZ cross section, SEM (scanning electron microscope), TEM (transmission electron microscope), EDS (energy dispersive X-ray analysis) using STEM (scanning transmission electron microscope), EPMA (electron probe micro analyzer)), LA-ICP-MS (Laser Ablation Inductively Coupled Plasma Mass Spectrometry) or the like is used to measure the number of atoms of the main component metal and the number of atoms of the additive metal element in the internal electrode layer 12. Thus, the concentration of the additive metal element can be measured.

If the concentration of the additive metal element is low in the entire internal electrode layer 12, the segregation layer 122 of the additive metal element may not be sufficiently formed in the first section 31. Therefore, it is preferable to set a lower limit for the concentration of the additive metal element in the entire internal electrode layer 12. In the present embodiment, the concentration of the additive metal element in the entire internal electrode layer 12 is preferably 0.01 at % or more, more preferably 0.05 at % or more, and 0.1 at % or more.

On the other hand, if the concentration of the additive metal element is high in the entire internal electrode layer 12, the effect of improving the bondability due to the difference in concentration between the first section 31 and the second section 32 will not work sufficiently, poor contact between the internal electrode layer and the external electrode may occur. Therefore, it is preferable to set an upper limit for the concentration of the additive metal element in the entire internal electrode layer 12. In this embodiment, the concentration of the additive metal element in the entire internal electrode layer 12 is preferably 5 at % or less, more preferably 3 at % or less, and even more preferably 1 at % or less.

Figure 7:
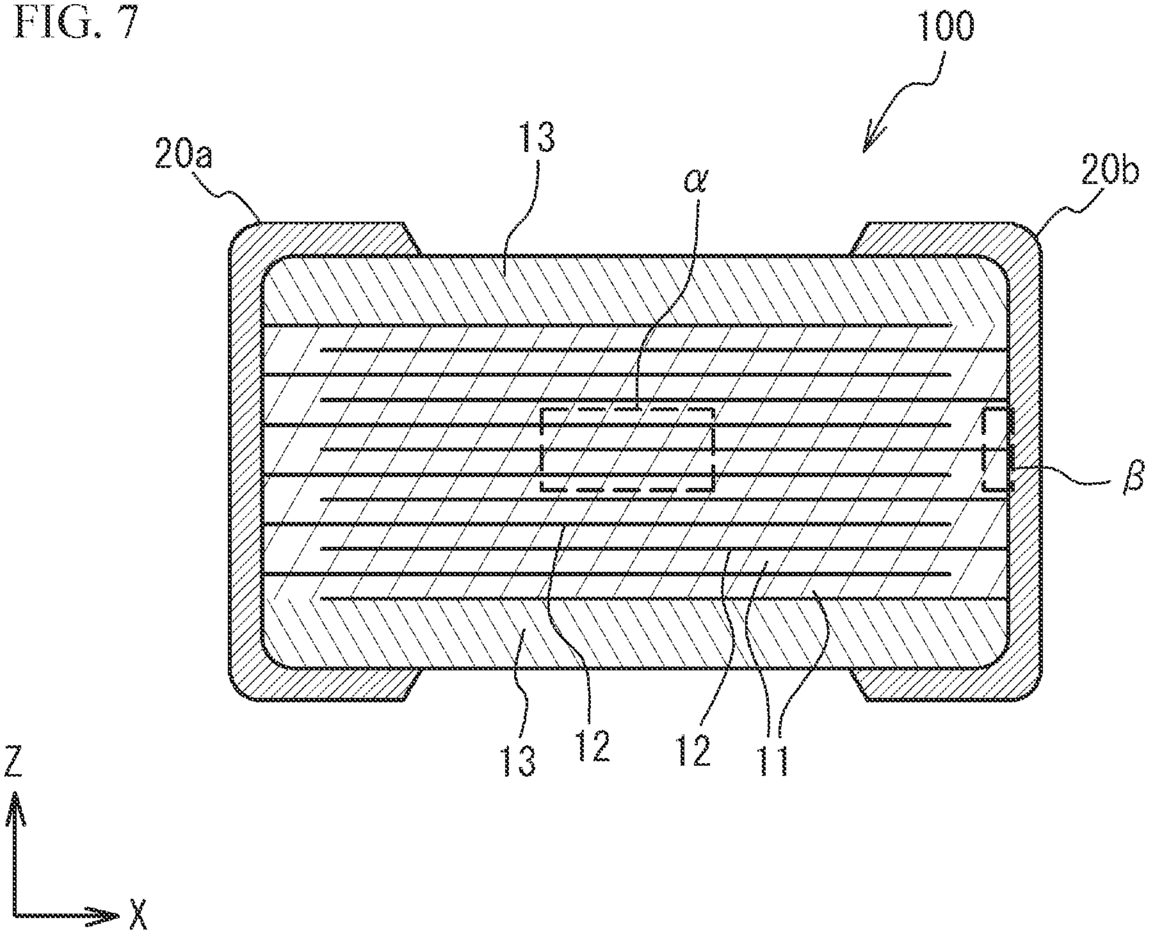
FIG. 7 illustrates a measurement range of a concentration ratio R.

From the viewpoint of sufficiently increasing the concentration of the additive metal element in the first section 31 and sufficiently decreasing the concentration of the additive metal element in the second section 32, it is preferable to set a lower limit to the concentration ratio. In the present embodiment, it is preferable to set a lower limit to the ratio of the concentration of the additive metal element in the first section 31 and the concentration of the additive metal element in the second section 32. Specifically, first, attention is paid to the specific internal electrode layer 12 in the XZ cross section at the center in the Y-axis direction. As illustrated in FIG. 7, in the X-axis direction, the concentration (high concentration) of the additive metal element in the central section α in the X-axis direction and the concentration (low concentration) of the additive metal element in a section β of the distance from the end of the internal electrode layer 12 connected to the external electrode to 5 μm to 10 μm are measured. For example, the average value of the concentrations at three points in the central section α is set as the high concentration, and the average value of the concentrations at three points in the section β is set as the low concentration. In this case, the concentration ratio R=the high concentration/the low concentration preferably exceeds 1.1, preferably 1.4 or more, and more preferably 1.6 or more.

The thickness of the dielectric layer 11 per layer is, for example, 0.3 μm or more and 10 μm or less, or 0.4 μm or more and 8 μm or less, or 0.5 μm or more and 5 μm or less, more preferably 0.3 μm or more and 3 μm or less. In general, the thinner the dielectric layer 11 is, the more likely it is to be affected by the diffusion of the additive metal element added to the internal electrode layer 12 and the local oxidation of the internal electrode layer 12, so that the electrical characteristics are likely to fluctuate. Also in the present embodiment, as the dielectric layer 11 is made thinner, it is expected that a greater effect will be exhibited. The thickness of the dielectric layer 11 per layer is obtained by exposing the cross section of the multilayer ceramic capacitor 100, for example, as illustrated in FIG. 2 and calculating an average value of ten thicknesses from an image taken with a microscope such as a scanning transmission electron microscope.

The thickness of the internal electrode layer 12 per layer is, for example, 0.1 μm or more and 2 μm or less, or 0.2 μm or more and 1 μm or less, or 0.3 μm or more and 0.8 μm or less. As the internal electrode layer 12 becomes thinner, local oxidation is more likely to occur due to an increase in the surface ratio. In this embodiment, it is expected that a greater action and effect will be exhibited. However, when the thickness of the internal electrode layer 12 is less than 0.05 μm, the thickness ratio of the segregation layer 122 becomes too high with respect to the thickness of the internal electrode layer 12. In this case, there is a possibility that influences of an increase in ESR (equivalent series resistance), oxidizing of the internal electrode layer, sinterability of the internal electrode layer cannot be ignored. The thickness of the internal electrode layer 12 per layer is measured by exposing the cross section of FIG. 2 of the multilayer ceramic capacitor 100 by mechanical polishing, and calculating an average value of the thicknesses of 10 points in an image captured by a microscope such as a scanning transmission electron microscope.

The additive metal element may be of one type, or may be of two or more types. For example, the additive metal element may include at least two types of the first additive metal element and the second additive metal element. When there are two or more additive metal elements, the concentration of the additive metal elements in the internal electrode layer 12 is the total concentration of the two or more additive metal elements.

Next, the concentration of the additive metal element forming the segregation layer 122 of the internal electrode layer 12 in the dielectric layer 11 and the dielectric pattern layer 17 will be described. In this embodiment, the dielectric layer 11 and the dielectric pattern layer 17 also contain the additive metal element. The concentration of the additive metal element in the dielectric layer 11 is higher than the concentration of the additive metal element in the dielectric pattern layer 17. Therefore, the concentration of the additive metal element in the dielectric portion of the capacity section 14 is higher than the concentration of the additive metal element in the dielectric portion of the end margin 15.

According to this configuration, the diffusion of the additive metal element from the internal electrode layer 12 to the dielectric pattern layer 17 is faster than the diffusion of the additive metal element from the internal electrode layer 12 to the dielectric layer 11 in the firing process. This is because the concentration of the additive metal element is set lower in the dielectric pattern layer 17 than in the dielectric layer 11, so that the additive metal element in the internal electrode layer 12 in the capacity section 14 with high concentration of the additive metal element easily diffuses into the dielectric pattern layer 17 with low concentration of the additive metal element. As a result, the diffusion amount of the additive metal element into the dielectric layer 11 can be suppressed, and deterioration of characteristics can be prevented. As a result, the bondability between the internal electrode layers 12 and the external electrodes 20*a* and 20*b* is improved. The concentration of the additive metal element in the dielectric layer 11 and the dielectric pattern layer 17 can be defined as at % of the additive metal element when the B site element of the main component ceramic is 100 at %.

If the concentration of the additive metal element in the dielectric layer 11 of the capacity section 14 is low, the diffusion of the additive metal element from the internal electrode layer 12 to the dielectric layer 11 may be promoted. Therefore, it is preferable to set a lower limit for the concentration of the additive metal element in the dielectric layer 11 of the capacity section 14. In the present embodiment, the concentration of the additive metal element in the dielectric layer 11 of the capacity section 14 is preferably 0.01 at % or higher, more preferably 0.2 at % or higher, and even more preferably 0.5 at % or higher.

On the other hand, if the concentration of the additive metal element in the dielectric layer 11 of the capacity section 14 is high, the additive element dissolves in $BaTiO_3$, which is the main ingredient, and may greatly change the dielectric properties. Therefore, it is preferable to set an upper limit for the concentration of the additive metal element in the dielectric layer 11 of the capacity section 14. In the present embodiment, the concentration of the additive metal element in the dielectric layer 11 of the capacity section 14 is preferably 1 at % or less, more preferably 0.7 at % or less, and even more preferably 0.5 at % or less.

When the dielectric layer 11 and the dielectric pattern layer 17 contain the additive metal element, it is preferable that the dielectric layer 11 and the dielectric pattern layer 17 contain the same kind of additive metal element as the additive metal element of the internal electrode layers 12. For example, when the internal electrode layers 12 contain Au as the additive metal element, it is preferable that the dielectric layers 11 and the dielectric pattern layers 17 also contain Au as the additive metal element. Moreover, when the internal electrode layers 12 contain Au and Sn as additive metal elements, the dielectric layers 11 and the dielectric pattern layers 17 preferably also contain Au and Sn as additive metal elements.

The additive metal element contained in the dielectric pattern layer 17 may be different from the additive metal element contained in the dielectric layer 11. In this case, the segregation layer 122 of the additive metal element contained in the dielectric pattern layer 17 is formed in the end margin 15, and the segregation layer 122 of the additive metal element contained in the dielectric layer 11 is formed in the capacity section 14. For example, it is preferable that the difference in electronegativity between the additive metal element contained in the dielectric layer 11 of the capacity section 14 and the additive metal element contained in the dielectric pattern layer 17 of the end margin 15 is within ±0.4, so that the two additive metal elements are easily alloyed. For example, the following combinations are preferable because the difference in electronegativity is 0.4 or less. Preferably, Sn—Cu is 0.06, Sn—Zn is 0.31, Fe—Al is 0.22, and Fe—Cr is 0.17. For example, the dielectric layer 11 of the capacity section 14 may contain Sn as the additive metal element, and the dielectric pattern layer 17 of the end margin 15 may contain Cu as the additive metal element. By using two types of additive metal elements that are easily alloyed, the two types of additive metal elements can be easily diffused.

The cover layer 13 preferably contains 1 at % or more and 2 at % or less of the main component metal of the internal electrode layers 12. For example, if the main component metal of the internal electrode layers 12 is Ni, the cover layer 13 preferably contains 1 at % or more and 2 at % or less of Ni. In this case, since the cover layer 13 is densified, the occurrence of cracks and chipping can be suppressed. Moreover, the side margins 16 preferably contain 1 at % or more and 2 at % or less of the main component metal of the internal electrode layers 12. For example, if the main component metal of the internal electrode layers 12 is Ni, the side margins 16 preferably contain 1 at % or more and 2 at % or less of Ni.

Figure 8:
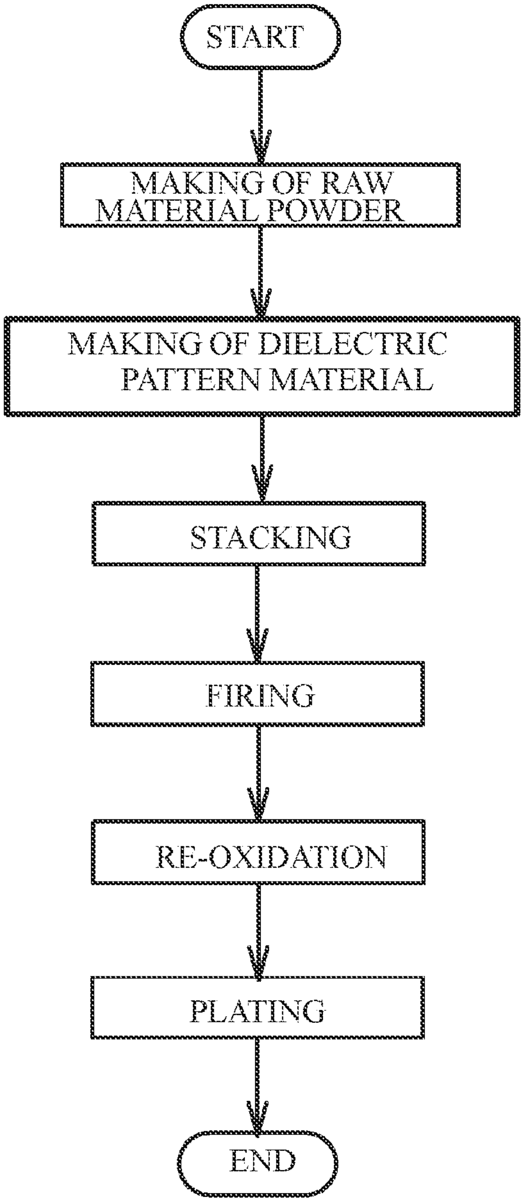
FIG. 8 illustrates a flow of a manufacturing method of a multilayer ceramic capacitor.

Next, a description will be given of a manufacturing method of the multilayer ceramic capacitors 100. FIG. 8 illustrates a manufacturing method of the multilayer ceramic capacitor 100.

(Making process of raw material powder) An A site element and a B site element are included in the dielectric layer 11 in a sintered phase of grains of $ABO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of the ceramic structuring the dielectric layer 11. For example, a solid-phase method, a sol-gel method, a hydrothermal method or the like can be used. The embodiments may use any of these methods.

A predetermined additive compound is added to the obtained dielectric powder according to the purpose. The additive compounds include oxides of Mo, Nb, Ta, W, Mg, Mn, V, Cr, rare earth elements (Y, Sm, Eu, Gd, Tb, Dy, Ho, Er, Tm and Yb), or oxides containing Co, Ni, Li, B, Na, K or Si, or glasses containing Co, Ni, Li, B, Na, K or Si. Among these, $SiO_2$ mainly functions as a sintering aid.

Also, the additive metal element of the internal electrode layer 12 is added to the dielectric powder. A dielectric material is obtained by the above processes.

(Making process of dielectric pattern material) Dielectric powder is made by the same process as the making process of the dielectric material. Next, an additive metal element for the internal electrode layers 12 is added to the dielectric powder. A dielectric pattern material is obtained by the above process. However, the concentration of the additive metal element in the dielectric pattern material is made lower than the concentration of the additive metal element in the dielectric material.

(Stacking process) Next, a binder such as polyvinyl butyral (PVB) resin, an organic solvent such as ethanol or toluene, and a plasticizer are added to the obtained dielectric material and wet-mixed. Using the obtained slurry, a dielectric green sheet 51 is formed on the substrate by, for example, a die coater method or a doctor blade method, and dried. The substrate is, for example, polyethylene terephthalate (PET) film.

Figure 9A:
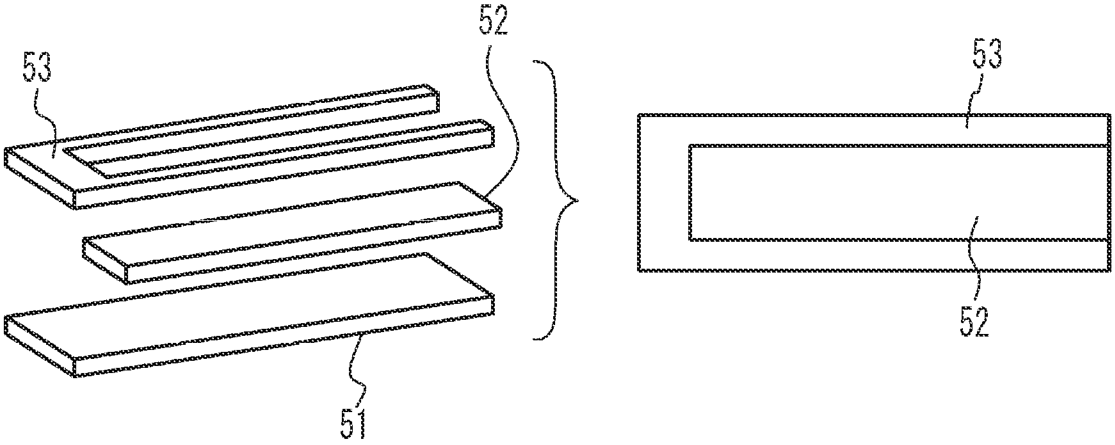
FIG. 9A and FIG. 9B illustrate a sacking process.

Next, as illustrated in FIG. 9A, a metal conductive paste for forming internal electrodes containing an organic binder is printed on the surface of the dielectric green sheet 51 by screen printing, gravure printing, or the like to form internal electrodes. Thus, an internal electrode pattern 52 for layers is arranged. Ceramic particles may be added to the metal conductive paste as a co-material. An organometallic complex solution containing the additive metal element or fine powder containing the additive metal element is added to each of the internal electrode patterns 52. The additive metal element may have the form of a single metal, an alloy, an oxide, or the like. As a method of introducing the additive metal element, the surface of the main component metal of the internal electrode pattern 52 may be coated with the additive metal element. One or more selected from Au, Sn, Cr, Fe, Y, In, As, Co, Cu, Ir, Mg, Os, Pd, Pt, Re, Rh, Ru, Se, Te, W, Zn, Ag, Mo, and Ge are added.

Next, a binder such as polyvinyl butyral (PVB) resin, an organic solvent such as ethanol and toluene, and a plasticizer are added to the dielectric pattern material are wet-mixed. As illustrated in FIG. 9A, a dielectric pattern 53 is formed by printing the resulting slurry in the peripheral region, where the internal electrode pattern 52 is not printed, on the dielectric green sheet 51 to cause the dielectric pattern 53 and the internal electrode pattern 52 to form a flat surface. The dielectric green sheet 51 on which the internal electrode pattern 52 and the dielectric pattern 53 are printed is referred to as a stack unit.

Figure 9B:
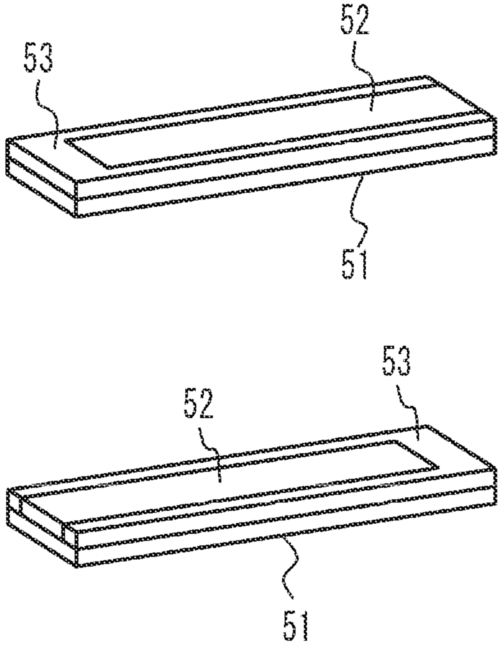

Thereafter, as illustrated in FIG. 9B, a predetermined number of stack units are stacked so that the internal electrode layers 12 and the dielectric layers 11 are alternated with each other and the end edges of the internal electrode layers 12 are alternately exposed to both edge faces in the length direction of the dielectric layer 11 so as to be alternately led out to a pair of the external electrodes 20*a* and 20*b* of different polarizations.

Figure 10:
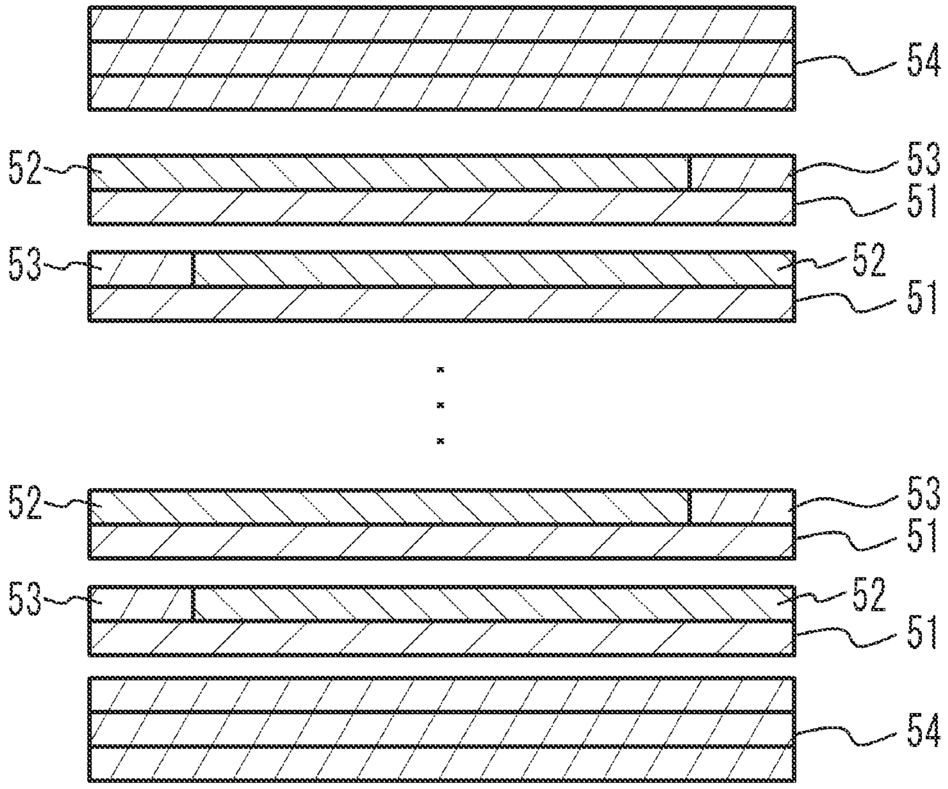
FIG. 10 illustrates a stacking process.

Next, as illustrated in FIG. 10, a predetermined number (for example, 2 to 10) cover sheet 54 are stacked on the stacked stack units and under the stacked stack units. After that, the stacked structure is thermally crimped. The resulting stacked structure is stamped into a predetermined size (for example, 1.0 mm×0.5 mm). The cover sheet 54 may have the same components as the dielectric green sheet 51. An additive of the cover sheet 54 may be different from that of the dielectric green sheet 51. After that, a metal conductive paste to be the external electrodes 20*a* and 20*b* is applied to both side faces of the ceramic multilayer structure after the cutting and is dried. Thus, a ceramic multilayer structure is obtained. Alternatively, after stacking a predetermined number of the cover sheet 54 and crimping the cover sheets 54, the resulting cover sheets 54 may be attached to on the stacked stack units and under the stacked stack units.

(Firing process) The binder is removed from the resulting ceramic multilayer structure in $N_2$ atmosphere. After that, a metal paste to be the base layer of the external electrodes 20*a* and 20*b* is applied to the resulting ceramic multilayer by a dipping or the like. The resulting ceramic multilayer structure is fired in a reducing atmosphere with an oxygen partial pressure of 10-5 to 10-8 atm in a temperature of 1100° C. to 1300° C. for 10 minutes to 2 hours. Thus, the multilayer ceramic capacitor 100 is formed.

(Re-oxidation process) After that, the multilayer ceramic capacitor 100 may be subjected to a re-oxidation process in a temperature range of 600 degrees C. to 1000 degrees C. in $N_2$ gas atmosphere.

(Plating process) After that, metal layers such as Cu, Ni, and Sn may be formed on the external electrodes 20*a* and 20*b* by plating.

According to the manufacturing method according to the present embodiment, since the concentration of the additive metal element in the dielectric green sheet 51 is higher than the concentration of the additive metal element in the dielectric pattern 53, in the capacity section 14, the diffusion of the additive metal element from the internal electrode layer 12 to the dielectric layers 11 is suppressed. As a result, the concentration of the additive metal element is lower in the second section 32 than in the first section 31 of FIG. 6. With this configuration, the segregation layer 122 containing the additive metal element is sufficiently formed in the capacity section 14, and an electrical barrier between the internal electrode layer 12 and the dielectric layer 11 is sufficiently formed. On the other hand, in the end margins 15, since the amount of the additive metal element is small, the bondability between the internal electrode layers 12 and the external electrodes 20*a* and 20*b* is improved.

The dielectric green sheet 51 and the dielectric pattern 53 preferably contain the same kind of additive metal element as the additive metal element of the internal electrode layers 12. The additive metal element contained in the dielectric pattern 53 may be different from the additive metal element contained in the dielectric green sheet 51. In this case, the segregation layer 122 of the additive metal element contained in the dielectric pattern layer 17 is formed in the end margin 15, and the segregation layer 122 of the additive metal element contained in the dielectric layer 11 is formed in the capacity section 14.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

EXAMPLES

Next, the multilayer ceramic capacitors in accordance with the embodiment were made. And the characteristics of the multilayer ceramic capacitors were measured.

(Example 1) In Example 1, Au was used as the additive metal element. The concentration of the additive metal element in the dielectric green sheet was 1 at %, and on the dielectric green sheet, a Ni paste containing 1 at % of the additive metal element was printed as an internal electrode pattern, and the dielectric pattern containing 0.5 at % or more of the additive metal element was printed around the Ni paste. Thus, a stack unit was obtained. Barium titanate was used as the main component ceramic of the dielectric green sheet and the dielectric pattern. A plurality of stack units thus obtained were stacked and cut to obtain a compact. The number of stack units was 500 layers. Ni paste was applied to the two end faces of the compact obtained, and the compact was fired. The obtained multilayer ceramic capacitor had a shape of 1005 (length 1.0 mm, width 0.5 mm, height 0.5 mm). The thickness of the dielectric layer was 0.6 μm.

(Example 2) In Example 2, the concentration of the additive metal element in the internal electrode pattern was set to 5 at %. Other conditions were the same as in Example 1.

(Example 3) In Example 3, the concentration of the additive metal element in the internal electrode pattern was set to 5 at %. The concentration of the additive metal element in the dielectric pattern was set to 0 atomic %. Other conditions were the same as in Example 1.

(Example 4) In Example 4, Sn was used as the additive metal element instead of Au. Other conditions were the same as in Example 1.

(Example 5) In Example 5, Sn was used as the additive metal element instead of Au. Other conditions were the same as in Example 2.

(Example 6) In Example 6, Sn was used as the additive metal element instead of Au. Other conditions were the same as in Example 3.

(Comparative example 1) In Comparative Example 1, no additive metal element was used. Therefore, the concentration of the additive metal element in the dielectric green sheet was set to 0 at %, the concentration of the additive metal element in the internal electrode pattern was set to 0 at %, and the concentration of the additive metal element in the dielectric pattern was set to 0 at %. Other conditions were the same as in Example 1.

(Comparative example 2) In Comparative Example 2, Au was used as the additive metal element. The concentration of the additive metal element in the dielectric green sheet was 0 at %, the concentration of the additive metal element in the internal electrode pattern was 1 at %, and the concentration of the additive metal element in the dielectric pattern was 0 at %. Other conditions were the same as in Example 1.

(Comparative Example 3) In Comparative Example 3, Au was used as the additive metal element. The concentration of the additive metal element in the dielectric green sheet was 1 at %, the concentration of the additive metal element in the internal electrode pattern was 1 at %, and the concentration of the additive metal element in the dielectric pattern was 1 at %. Other conditions were the same as in Example 1.

When the vicinity of the interface between the internal electrode layer and the dielectric layer in the capacity section was analyzed for Examples 1 to 3, a segregation layer of Au was confirmed. In Examples 4 to 6, when the vicinity of the interface between the internal electrode layer and the dielectric layer in the capacity section was analyzed, a segregation layer of Sn was confirmed.

The concentration ratio R of the additive metal element was measured for each of the multilayer ceramic capacitors of Examples 1-6 and Comparative Examples 1-3. SEM-EDS was used for the measurement. The concentration ratio R was 1.7 in Example 1, 1.2 in Example 2, 1.6 in Example 3, 1.9 in Example 4, and 1.5 in Example 5, 1.8 in Example 6, 1.0 in Comparative Example 2, 1.0 in Comparative Example 3. In Comparative Example 1, no additive metal element was added, so the concentration ratio R could not be measured.

Next, an electrostatic capacity test was conducted on each of the multilayer ceramic capacitors of Examples 1 to 6 and Comparative Examples 1 to 3. In the electrostatic capacity test, the sample was left at 150° C. for 1 hour and under standard conditions for 24 hours, and then the electrostatic capacity was measured using an LCR meter under conditions of 0.5 V-1 kHz. The electrostatic capacity was 22 μF in Example 1, 20 μF in Example 2, 22 μF in Example 3, 22 μF in Example 4, 21 μF in Example 5, and 22 μF in Example 6, 22 μF in Comparative Example 1, 15 μF in Comparative Example 2, and 15 μF in Comparative Example 3. When the measured electrostatic capacity was 20 μF or more, it was judged as good, and when the measured electrostatic capacity was less than 20 μF, it was judged as bad. It is thought that if the bondability between the internal electrode layers and the external electrodes ss good, the electrostatic capacity will increase. In Examples 1 to 6 and Comparative Example 1, the electrostatic capacity was judged to be good, and in Comparative Examples 2 and 3, the electrostatic capacity was judged to be bad.

Next, a reliability test was conducted on each of the multilayer ceramic capacitors of Examples 1 to 6 and Comparative Examples 1 to 3. In the reliability test, a voltage of 6.3 V was applied at 85° C. for 1000 hours and 2000 hours, and then left at room temperature for 24 hours, after which insulation resistance was evaluated. An insulation resistance value of less than 10 MΩ was regarded as failure. If no failure occurred even after 1000 hours, it was judged as good "○". If no failure occurred even after 2000 hours, it was judged as very good "double circle". If failure occurred until 1000 hours, it was judged as bad "x". In the reliability test, Example 1 was judged to be good "○", Example 2 was judged to be very good "double circle", Example 3 was judged to be very good "double circle", Example 4 was judged to be good "○", Example 5 was judged to be very good "double circle", Example 6 was judged to be very good "double circled", Comparative Example 1 was judged to be bad "x", Comparative Example 2 was judged to be bad "x", and Comparative Example 3 was judged to be good "○".

If it was not judged to be bad in either the reliability test or the electrostatic capacity test, the overall judgment was "good". If any one of the reliability test and the electrostatic capacity test was judged to be bad, the overall judgment was "bad".

All of Examples 1 to 6 were judged to be "good" in the overall evaluation. It is thought that this was because the concentration of the additive metal element in the dielectric green sheet was higher than the concentration of the additive metal element in the dielectric pattern, diffusion of the additive metal element from the internal electrode layer to the dielectric layer was suppressed in the capacity section, and the concentration of the additive metal element was lower in the second section 32 than in the first section 31. On the other hand, in Comparative Examples 1 to 3, the overall judgment was "bad". In Comparative Example 1, it is thought that the additional metal element was not added to the internal electrode pattern, and a segregation layer of the additional metal element was not formed, so that sufficient reliability was not obtained. In Comparative Example 2, it is thought that the additive metal element diffused from the internal electrode pattern to the dielectric layer and the dielectric pattern, and a sufficient segregation layer was not formed. In Comparative Example 3, it is thought that the diffusion of the additive metal element from the internal electrode layer to the dielectric pattern was suppressed, and the concentration of the additive metal element in the internal electrode layer of the end margin was increased. In Examples 2, 3, 5, and 6, it is thought that the addition of a large amount of the additive metal element to the internal electrode pattern increased the concentration of the additive metal element in the segregation layer, resulting in high reliability. In Examples 3 and 6, as compared with Examples 2 and 5, it is thought that diffusion of the additive metal element into the dielectric pattern was promoted, and high electrostatic capacity was obtained. Further, comparing the concentration ratio R, it is confirmed that Sn diffuses more easily into barium titanate than Au.

TABLE 1

| | ADDITIVE METAL ELEMENT | INTERNAL ELECTRODE PATTERN | GREEN SHEET | DIELECTRIC PATTERN | CONCENTRATION RATIO R | ELECTROSTATIC CAPACITY | RELIABILITY | OVERALL JUDGE |
|---|---|---|---|---|---|---|---|---|
| EXAMPLE 1 | Au | 1at % | 1at % | 0.5at % | 1.7 | 22 μF | ○ | ○ |
| EXAMPLE 2 | Au | 5at % | 1at % | 0.5at % | 1.2 | 20 μF | ◎ | ○ |
| EXAMPLE 3 | Au | 5at % | 1at % | 0at % | 1.6 | 22 μF | ◎ | ○ |
| EXAMPLE 4 | Sn | 1at % | 1at % | 0.5at % | 1.9 | 22 μF | ○ | ○ |
| EXAMPLE 5 | Sn | 5at % | 1at % | 0.5at % | 1.5 | 21 μF | ◎ | ○ |
| EXAMPLE 6 | Sn | 5at % | 1at % | 0at % | 1.8 | 22 μF | ◎ | ○ |
| COMPARATIVE EXAMPLE 1 | — | 0at % | 0at % | 0at % | — | 22 μF | X | X |
| COMPARATIVE EXAMPLE 2 | Au | 1at % | 0at % | 0at % | 1.0 | 15 μF | X | X |
| COMPARATIVE EXAMPLE 3 | Au | 1at % | 1at % | 1at % | 1.0 | 15 μF | ○ | X |

(Example 7) In Example 7, Sn was used as the additive metal element in the dielectric green sheet and the internal electrode pattern, and Cu was used as the additive metal element in the dielectric pattern. The concentration of Sn in the dielectric green sheet was set to 1 at %, and a Ni paste containing 1 at % of Sn was printed on the dielectric green sheet as an internal electrode pattern. And the dielectric pattern containing 0.5 at % or more of Cu was printed around the Ni paste. Thus, a stack unit was obtained. Barium titanate was used as the main component ceramic of the dielectric green sheet and the dielectric pattern. A plurality of stack units thus obtained were stacked and cut to obtain a compact. The number of the stack units was 500 layers. Ni paste was applied to the two end faces of the compact obtained, and the compact was fired. The obtained multilayer ceramic capacitor had a shape of 1005 (length 1.0 mm, width 0.5 mm, height 0.5 mm). The thickness of the dielectric layer was 0.6 μm.

(Example 8) In Example 8, Sn was used as the additive metal element in the dielectric green sheet and the internal electrode pattern, and Zn was used as the additive metal element in the dielectric pattern. The concentration of Sn in the dielectric green sheet was set to 1 at %, the concentration of Sn in the internal electrode pattern was set to 1 at %, and the concentration of Zn in the dielectric pattern was set to 0.5 at %. Other conditions were the same as in Example 7.

(Example 9) In Example 9, Fe was used as the additive metal element in the dielectric green sheet and the internal electrode pattern, and Al was used as the additive metal element in the dielectric pattern. The concentration of Fe in the dielectric green sheet was set to 1 at %, the concentration of Fe in the internal electrode pattern was set to 1 at %, and the concentration of Al in the dielectric pattern was set to 0.5 at %. Other conditions were the same as in Example 7.

(Example 10) In Example 10, Fe was used as the additive metal element in the dielectric green sheet and the internal electrode pattern, and Cr was used as the additive metal element in the dielectric pattern. The concentration of Fe in the dielectric green sheet was set to 1 at %, the concentration of Fe in the internal electrode pattern was set to 1 at %, and the concentration of Cr in the dielectric pattern was set to 0.5 at %. Other conditions were the same as in Example 7.

(Comparative Example 4) In Comparative Example 4, Sn was used as the additive metal element in the dielectric green sheet and the internal electrode pattern, and Au was used as the additive metal element in the dielectric pattern. The concentration of Sn in the dielectric green sheet was set to 1 at %, the concentration of Sn in the internal electrode pattern was set to 1 at %, and the concentration of Au in the dielectric pattern was set to 1 at %. Other conditions were the same as in Example 7.

(Comparative Example 5) In Comparative Example 5, Fe was used as the additive metal element in the dielectric green sheet and the internal electrode pattern, and Au was used as the additive metal element in the reverse pattern. The concentration of Fe in the dielectric green sheet was set to 1 at %, the concentration of Fe in the internal electrode pattern was set to 1 at %, and the concentration of Au in the reverse pattern was set to 1 at %. Other conditions were the same as in Example 7.

The concentration ratio R of the additive metal element was measured for each of the multilayer ceramic capacitors of Examples 7 to 10 and Comparative Examples 4 and 5. SEM-EDS was used for the measurement. The concentration ratio R was 2.2 in Example 7, 2.0 in Example 8, 1.8 in Example 9, 1.8 in Example 10, and 1.0 in Comparative Example 4, and 1.0 in Comparative Example 5.

Next, the electrostatic capacity test was conducted on each of the multilayer ceramic capacitors of Examples 7-10 and Comparative Examples 4 and 5. In the electrostatic capacity test, the sample was left at 150° C. for 1 hour and under standard conditions for 24 hours, and then the electrostatic capacity was measured using an LCR meter under conditions of 0.5 V-1 kHz. The electrostatic capacity was 22 μF in Example 7, 22 μF in Example 8, 22 μF in Example 9, 22 μF in Example 10, 15 μF in Comparative Example 4, and 15 μF in Comparative Example 5. When the measured electrostatic capacity was 20 μF or more, it was judged as good, and when the electrostatic capacity was less than 20 μF, it was judged as bad. In Examples 7 to 10, the electrostatic capacity was judged to be good, and in Comparative Examples 4 and 5, the electrostatic capacity was judged to be bad.

Next, the reliability test was conducted on each of the multilayer ceramic capacitors of Examples 7-10 and Comparative Examples 4 and 5. In the reliability test, a voltage of 6.3 V was applied at 85° C. for 1000 hours and 2000 hours, and then left at room temperature for 24 hours, after which insulation resistance was evaluated. An insulation resistance value of less than 10 MΩ was regarded as failure. If no failure occurred even after 1000 hours, it was judged as good "○". If no failure occurred even after 2000 hours, it was judged as very good "double circle". If failure occurred until 1000 hours, it was judged as bad "x". In the reliability test, Example 7 was judged to be good "○", Example 8 was judged to be good "○", Example 9 was judged to be good "○", Example 10 was judged to be good "○", Comparative Example 4 was judged to be good "○", and Comparative Example 5 was judged to be good "○".

If it was not judged to be bad in either the reliability test or the electrostatic capacity test, the overall judgment was "good". If any one of the reliability test and the electrostatic capacity test was judged to be bad, the overall judgment was "bad".

Regarding Examples 7 to 10, even if the additive metal element added to the internal electrode pattern and the additive metal element added to the dielectric pattern were different from each other, the overall judgment was "good". It is thought that this was because Sn and Cu were easily alloyed, Sn and Zn were easily alloyed, Fe and Al were easily alloyed, or Fe and Cr were easily alloyed. On the other hand, in Comparative Examples 4 and 5, the overall judgment was "bad". It is thought that this was because the diffusion of the additive metal element from the internal electrode layer to the dielectric pattern was suppressed, and the concentration of the additive metal element in the internal electrode layer of the end margin was increased.

TABLE 2

| | ADDITIVE METAL ELEMENT | INTERNAL ELECTRODE PATTERN | GREEN SHEET | ADDITIVE METAL ELEMENT | DIELECTRIC PATTERN | CONCENTRATION RATIO R | ELECTROSTATIC CAPACITY | RELIABILITY | OVERALL JUDGE |
|---|---|---|---|---|---|---|---|---|---|
| EXAMPLE 7 | Sn | 1at % | 1at % | Cu | 0.5at % | 2.2 | 22 μF | ○ | ○ |
| EXAMPLE 8 | Sn | 1at % | 1at % | Zn | 0.5at % | 2.0 | 22 μF | ○ | ○ |
| EXAMPLE 9 | Fe | 1at % | 1at % | Al | 0.5at % | 1.8 | 22 μF | ○ | ○ |
| EXAMPLE 10 | Fe | 1at % | 1at % | Cr | 0.5at % | 1.8 | 22 μF | ○ | ○ |
| COMPARATIVE EXAMPLE 4 | Sn | 1at % | 1at % | Au | 1at % | 1.0 | 15 μF | ○ | x |
| COMPARATIVE EXAMPLE 5 | Fe | 1at % | 1at % | Au | 1at % | 1.0 | 15 μF | ○ | x |

Although the embodiments of the present invention have been described in detail, it is to be understood that the various change, substitutions, and alterations could be made hereto without departing from the spirit and scope of the invention.

What is claimed is:

1. A ceramic electronic device comprising:

a multilayer chip in which each of a plurality of dielectric layers including ceramic as a main component and each of a plurality of internal electrode layers including a first metal as a main component are alternately stacked, and each of the plurality of internal electrode layers is exposed alternately to a plurality of portions of the multilayer chip; and external electrodes, each of which is provided on each of the plurality of portions of the multilayer chip, wherein a dielectric pattern is provided in end margins where internal electrode layers connected to one of the external electrodes face each other with no internal electrode layer connected to the other of the external electrodes interposed therebetween, wherein the plurality of internal electrode layers include one or more types of a second metal which is different from the first metal, wherein the plurality of dielectric layers include a first additive metal, wherein the dielectric pattern includes a second additive metal, wherein a type of the first additive metal of the plurality of dielectric layers is different from a type of the second additive metal of the dielectric pattern, wherein a concentration of the first additive metal in the plurality of dielectric layers is higher than a concentration of the second additive metal of the dielectric pattern, and wherein a concentration of the second metal in internal electrode layers in a capacity section in which two adjacent internal electrode layers connected to different external electrodes face each other is more than 1.1 times as a concentration of the second metal in internal electrode layers in the end margins.

2. The ceramic electronic device as claimed in claim 1, wherein the second metal is one or more of As, Au, Co, Cr, Cu, Fe, In, Ir, Mg, Os, Pd, Pt, Re, Rh, Ru, Se, Sn, Te, W, Y and Zn.

3. The ceramic electronic device as claimed in claim 1, wherein at least one of the plurality of internal electrode layers has a segregation layer of the second metal at an interface with one of the plurality of dielectric layers next to the at least one of the plurality of internal electrode layers.

4. The ceramic electronic device as claimed in claim 1, wherein the first metal is Ni or Cu.

5. The ceramic electronic device as claimed in claim 1, wherein the plurality of internal electrode layers include 0.01 at % or more and 5 at % or less of the second metal with respect to the first metal.

6. The ceramic electronic device as claimed in claim 1, wherein a main component of the external electrodes is Ni.

7. The ceramic electronic device as claimed in claim 1, wherein the plurality of dielectric layers include 0.01 at % or more and 1 at % or less of the second metal.

8. The ceramic electronic device as claimed in claim 1, wherein a difference between electronegativity of the first additive metal element of the plurality of dielectric layers and electronegativity of the second additive metal of the dielectric pattern is within ±0.4.

9. The ceramic electronic device as claimed in claim 1, wherein a combination of the first additive metal of the plurality of dielectric layers and the second additive metal of the dielectric pattern is Sn and Cu, Sn and Zn, Fe and Al, or Fe and Cr.

10. The ceramic electronic device as claimed in claim 1, further comprising:

a cover layer that includes ceramic as a main component and is provided on at least one of an upper face and a lower face in a stacking direction of a multilayer structure in which the plurality of dielectric layers and the plurality of internal electrode layers are stacked, wherein, in the cover layer, a concentration of a main component metal of the plurality of internal electrode layers is 1 at % or more and 2 at % or less.

11. The ceramic electronic device as claimed in claim 1, wherein the plurality of portions are two end faces of the multilayer chip, and wherein a concentration of the first metal of the plurality of internal electrode layers is 1 at % or more and 2 at % or less in side margins that cover each of edges, extending toward two side faces of the multilayer chip, of the plurality of internal electrode layers.

12. A ceramic electronic device comprising:

A multilayer chip in which each of a plurality of dielectric layers including ceramic as a main component and each of a plurality of internal electrode layers including a first metal as a main component are alternately stacked, and each of the plurality of internal electrode layers is exposed alternately to a plurality of portions of the multilayer chip; and external electrodes, each of which is provided on each of the plurality of portions of the multilayer chip, wherein a dielectric pattern is provided in end margins where internal electrode layers connected to one of the external electrodes face each other with no internal electrode layer connected to the other of the external electrodes interposed therebetween, wherein the plurality of internal electrode layers include one or more types of a second metal which is different from the first metal, wherein the plurality of dielectric layers include a first additive metal, wherein the dielectric pattern includes a second additive metal, wherein a type of the first additive metal of the plurality of dielectric layers is different from a type of the second additive metal of the dielectric pattern, and wherein a difference between electronegativity of the first additive metal of the plurality of dielectric layers and electronegativity of the second additive metal of the dielectric pattern is within ±0.4.

13. The ceramic electronic device as claimed in claim 12, wherein a concentration of the first additive metal is higher in the plurality of dielectric layers than the second additive metal in the dielectric pattern.

* * * * *